(No Model.)
G. H. PERKINS.
PROCESS OF DISTILLING PETROLEUM.
No. 399,073. Patented Mar. 5, 1889.
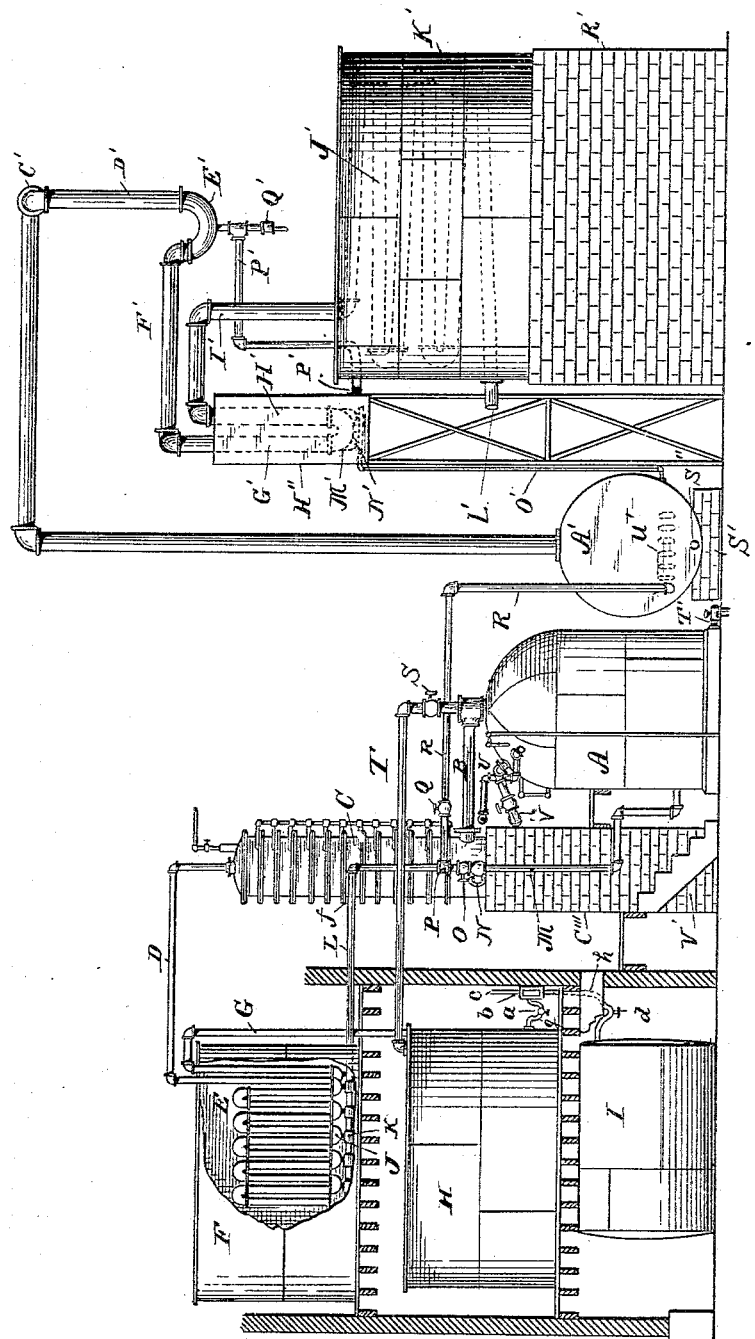
WITNESSES:
John Jolley
F. Norman Dixon.
INVENTOR
George H. Perkins,
By his Attorneys,
W. C. Strawbridge
J. Bonsall Taylor.

UNITED STATES PATENT OFFICE.

GEORGE H. PERKINS, OF PHILADELPHIA, PENNSYLVANIA.

PROCESS OF DISTILLING PETROLEUM.

SPECIFICATION forming part of Letters Patent No. 399,073, dated March 5, 1889.

Application filed May 14, 1886. Serial No. 202,148. (No model.)

*To all whom it may concern:*

Be it known that I, GEORGE H. PERKINS, a citizen of the United States, residing in the city and county of Philadelphia, and State of Pennsylvania, have invented a new and useful Process of Distilling Petroleum, of which the following is a specification.

Generally stated the process of distillation of petroleum oil, as heretofore practiced, has consisted essentially in submitting the product to be distilled, in a vessel or still, to heat, whereby the oil has been vaporized, the vapors having been conveyed by suitable pipes through condensing chambers or worms, externally cooled, with the result that the lighter products have been condensed in the condensing devices and therefrom conveyed to proper storage receptacles, the heavier products having been condensed in the condensing devices and therefrom returned by suitable pipes to the still for redistillation. In the process of distillation just referred to the quantity of the lighter products of distillation obtained in the condensing apparatus employed has been too small as compared with the resulting heavier products, which, as above stated, had, during the process, to be returned to the still for further treatment. Moreover, in said process, the return of said heavier products of distillation from the condensing apparatus to the still resulted in the admixture therewith of the impure residual matters remaining in the still and the consequent deterioration of the product obtained by the redistillation of said heavier products.

Generally stated my invention consists in treating a petroleum product with heat in a still, in passing the resulting vapors through a suitable condenser, in conveying by suitable conduits, the lighter distillates to a proper receiving vessel, and in conveying the heavier distillates, which have not been trapped back into the original still, to a supplementary vessel or still in which they may, without other heat than that originally derived from the original still, further separate into heavier and lighter products.

A convenient form or embodiment of my invention is represented in the drawing, and is hereinafter described and claimed.

The drawing is a side elevational and sectional view of my apparatus, the construction of which will be understood from a description of its mode of operation.

A is a still which, at its bottom, is provided with a steam-coil. Into this still is charged the petroleum product which is to be distilled and separated into distillates of different gravities. The vapors from this still pass through the pipe B to the column C which is provided with successive cooling chambers, of any well known construction, and thence through the pipe D to and through the goose worm E located in the water-supplied condenser F, and thence through the return pipe G to and through a goose worm located in the water-provided condenser H. From the condenser H the condensed lighter distillates are conveyed through the traps $g$ and $h$ to a receiving vessel I, said traps being provided with cocks $a$ and $d$ to permit of samples of distillate being, at these points, run off for examination.

The trap $g$ is provided with a glass reservoir $b$ to permit the flowing distillate to be seen, said reservoir being provided with a gas vent pipe $c$ for the escape of such gases as may be carried forward with the condensed distillate. Such heavy distillates as are condensed in the column C are conveyed therefrom, at the point N, through the pipe M back to the still A for redistillation. Up to this point of the operation the valve O in the pipe P has been open. When the lighter distillates begin to flow into the reservoir I the valve O is closed and such heavy distillates as have condensed, or such as shall during the remaining part of the process condense, in the bottom of the return bends of the goose worm E, are, by the pipe L, and the pipe R, conveyed to a capacious supplementary still or separating chamber A', which may be of any suitable construction and of which the capacity should be at least as great as that of the original still A. These condensed products are fed to the still A' at a point near the bottom thereof, and under the surface of a bath of benzine, or other petroleum product, which has previously been charged into the still A' and by means of a steam coil U' heated up to a temperature corresponding to the temperature of the condensed distillate charged into the tank A' from the bottom of the return bends of the goose worm E. So soon as the trapped back material from the goose worm E commences to flow into the supplementary still A' the steam is turned off from the coil U' and is kept turned off so long as the trapped back material continues to flow into said supplementary still. At this point of the operation the lighter distillates from the still A are being received in the vessel I, and the heavier products condensed in the column C are being returned to the still A for redistillation. At this point also the heavier products condensed in the goose worm E are being conveyed to the supplementary still A', where they are, by reason of the enlarged space therein afforded, caused to more perfectly separate into vapors of different gravities. These vapors are thence, by the pipes B' C' D' and F', conveyed to and through the goose worm G' H' contained in the water-provided condenser H", and thence through the pipe I', to and through the goose worm J' located within a water-provided condenser K', with the result that the heavier distillates are condensed in the trap E' and in the bottom of the return bends M' of the goose worms G' H' and are therefrom, by the pipes P' N' and O' returned to the still A' for redistillation. The lighter vapors from the supplementary still A', which are condensed in the goose worm J', are conveyed by the pipe L' to a proper receiving vessel.

R' and S' are brick work upon which the condenser K' and supplementary still A' are respectively supported. The apparatus is operated in the manner just described so long as the lighter distillate hereinbefore referred to is being received in the receptacle I from the still A. When this product ceases to be produced by the still A the valve Q is closed and the valve O is opened, whereby the heavy distillates condensed both in the column C and in the bottom of the return bends of the goose worm E are trapped back into the still A. At this point the supply of heavy distillate to the supplementary still A' ceases. Steam is now supplied to the steam coil U' to maintain the temperature of the trapped back product remaining therein, and to effect the further separation of said residual product. The application of heat to the supplementary still A' is continued so long as the distillate escaping at L' remains of the same gravity as the distillate which has during previous part of the process escaped therefrom. So soon as the distillates received from the pipe L' and from the cock a are of gravities lower than is desired the steam is turned off from the coil U', and from the coil in the bottom of the still A, and the heavy residual products in said stills A and A' are drawn off through the pipes S" and D', the still A is again charged, and the operation hereinbefore described repeated.

U and V are pipes through which respectively the still A is charged, and the steam coil therein fed.

T is a pipe leading from the still A to the condenser H. This pipe may, by opening the valve S, be employed, at or near the end of the distillation in the still A, to conduct the last distillates from said still directly to the condensing worms in said condenser.

Heretofore it has been usual in the distillation of the products of petroleum to employ apparatus in which the heavy distillates in the worm E were returned to the still A, for redistillation, through the pipe L connecting with the bottom of the return bends of said goose worm E and emptying into the column C at a point f.

By my invention, I am enabled, by reason of the provision of a capacious supplementary still or separating chamber, to effect a quiet natural and more perfect separation of the gases of different gravities, and to avoid the return of the heavy distillates, condensed in the goose worm E, to the original still, and the consequent saturation of said condensed heavy distillates with the impurities remaining in said still, with the result that the quantity of the lighter distillates produced from a given amount of petroleum product is thereby increased and the quality of said product much improved.

Having thus described my invention, I claim—

1. The process of distilling a petroleum product and separating its distillates, which consists, in treating said product with heat in a still, in passing the resulting vapors through a suitable condenser, in conveying, by suitable conduits, the lighter distillates to a proper receiving vessel, and in conveying the heavier distillates, which have not been trapped back into the original still, to a supplementary vessel or still in which they may, without other heat than that originally derived from the original still, further separate into heavier and lighter products, as specified.

2. The process of distilling a petroleum product and separating its distillates, which consists, in treating said product with heat in a still, in passing the resulting vapors through a suitable condenser, in conveying, by suitable conduits, the lighter distillates to a proper receiving vessel, in conveying the heavier distillates, which have not been trapped back into the original still, to a supplementary vessel or still in which they may, without other heat than that originally derived from the original still, further separate into heavier and lighter distillates, and, finally, in distilling and separating the residual products remaining in said supplementary still, by the application of heat thereto, as specified.

3. The process of distilling a petroleum product and separating its distillates, which consists, in treating said product with heat in a still, in passing the resulting vapors through a suitable condenser, in conveying, by suitable conduits, the lighter distillates to a proper receiving vessel, in conveying the heavier distillates, which have not been trapped back into the original still, to a supplementary vessel or still in which they may, without other heat than that originally derived from the original still, further separate into heavier and lighter distillates, and, finally, in distilling and separating the residual products remaining in said supplementary still by the application of heat thereto, in conveying the resulting vapors from said supplementary still to and through a proper condenser, in conveying, by suitable conduits, the resulting lighter distillates to a proper receiving vessel, and in conveying the resulting heavier distillates back to the supplementary still, as specified.

In testimony whereof I have hereunto signed my name this 14th day of April, A. D. 1886.

GEORGE H. PERKINS.

In presence of—
  WM. C. STRAWBRIDGE,
  J. BONSALL TAYLOR.